United States Patent [19]
English et al.

[11] Patent Number: 5,483,688
[45] Date of Patent: Jan. 9, 1996

[54] ADAPTIVE AUTOMATIC ANTENNA TUNING METHOD AND APPARATUS

[75] Inventors: James D. English, Aloha; Bruce C. Nepple, Portland, both of Oreg.

[73] Assignee: Seiko Communications Holding N.V., Netherlands Antilles

[21] Appl. No.: 7,443

[22] Filed: Jan. 22, 1993

[51] Int. Cl.$^6$ .................................................. H04B 1/18
[52] U.S. Cl. .................................. 455/184.1; 455/193.1; 455/195.1; 455/226.2
[58] Field of Search .......................... 455/193.1, 184.1, 455/193.2, 193.3, 226.2, 290, 195.1, 173.1, 187.1, 169.1, 150.1, 197.2, 254, 180.3, 180.4, 183.1, 183.2, 154.1, 150.1, 197.3

[56] References Cited

U.S. PATENT DOCUMENTS

| | | | |
|---|---|---|---|
| 4,291,413 | 9/1981 | Henderson et al. | 455/184.1 |
| 4,334,323 | 6/1982 | Moore | 455/184.1 |
| 4,862,516 | 8/1989 | Macnak et al. | 455/195.1 |
| 5,136,719 | 8/1992 | Gaskill et al. | 455/193.1 |
| 5,263,183 | 11/1993 | Owen | 455/193.1 |
| 5,301,358 | 4/1994 | Gaskill et al. | 455/193.2 |

*Primary Examiner*—Edward F. Urban
*Assistant Examiner*—Nguyen Vo
*Attorney, Agent, or Firm*—Elmer Galbi

[57] ABSTRACT

An improved method and apparatus for automatically tuning an antenna includes adaptive antenna tuning based on a current radio reception frequency and on prior antenna tuning cycles to establish a predictor value. The predictor value establishes an antenna tuning voltage sub-range most likely to contain the optimum antenna tuning voltage, but is a smaller range than the full antenna tuning voltage range. The antenna tuning voltage sub-range is then traversed while monitoring a signal strength indicator to identify an antenna tuning voltage providing optimum tuning conditions. Because only a sub-range of the full antenna tuning voltage range need be traversed, by virtue of the predictor value, relatively small increments in antenna tuning voltage may be used in traversing this sub-range. As a result, the execution time and accuracy of the antenna tuning method of the present invention is improved relative to prior automatic antenna tuning methods.

8 Claims, 4 Drawing Sheets

ADAPTIVE AUTOMATIC ANTENNA TUNING METHOD AND APPARATUS

BACKGROUND OF THE INVENTION

The present invention relates generally to radio receivers and associated antennas, and more particularly to a method and apparatus for automatically and adaptively tuning a radio receiver antenna.

Wristwatch paging radio receivers are known in the art, as illustrated by U.S. Pat. No. 4,713,808 issued to Gaskill et al. Such receivers often use antennas disposed in a band looped around the user's wrist or neck. The impedance of such an antenna is strongly dependent on many factors, including band length, degree of parasitic coupling to the user's body and other objects, and the frequency at which the receiver operates. As implemented in a frequency agile wristwatch radio signal receiving device, the impedance of an antenna provided as the wristband of the watch suffers particularly from adjustment in band size, i.e., to match the user's wrist over a wide range of frequencies, whether or not the device is being worn by the user, whether or not the band clasp is open or closed, the watch case material and construction and its effect on antenna capacitance, and parametric variations such as original component variation according to manufacturer tolerance in components or replacement component variation relative to device specifications.

Wristband antennas are relatively small with respect to wave length and typically have a relatively high Q. Even a slight change in any of the above-referenced impedance factors can result in a large change in tuned frequency. Furthermore, the small sized antenna provides a relatively small signal to the attached receiver. A tuning/impedance matching circuit must be used to closely match and tune the antenna to the receiver to insure optimum power transfer therebetween.

WIPO patent publication, 88/05213, discloses a wristwatch receiver embodying a variable matching circuit. In the disclosed system, the matching circuit includes a variable capacitor accessed by opening a cover element. Once exposed, the circuit is tuned with a screwdriver. The WIPO disclosure proposes adjusting the capacitor by using an auxiliary RF signal generator located near the receiver to radiate a signal at the desired reception frequency. The receiver displays the relative strength of the received signal on an LCD display positioned beneath the removal cover. With the RF signal generator activated, the user can adjust the variable matching capacitor until the display indicates that a maximum signal is being received.

The tuning procedure for the system disclosed in this WIPO publication requires manual intervention. It requires that a cover be removed from the watch and a micro miniature capacitor be adjusted with a screwdriver. The receiver may become detuned as soon as it is moved, whether off the user's wrist or simply towards or away from the user's body. Each such movement changes the antenna's parasitic coupling to the surrounding materials and thereby changes it resonant frequency which requires another tuning process.

A related WIPO publication, 88/05214, discloses a second wristwatch receiver embodying a variable tuning circuit. In this second system, an automatic tuning circuit within the wristwatch receiver is activated in response to reception of a tuning mode signal on the frequency being received. This tuning mode signal can be part of the system synchronization signal, an independent selective call signal decodable by an entire group of receivers or a secondary signal decoded after a receiver's individual selective call address has been decoded. The tuning operation can also be manually initiated by a user programmable switch.

Tuning results from adjustment in a varactor tuning element controllably biased by a microcomputer through a D-A converter. The biased voltage is increased, apparently in uniform steps, until a drop is noted in the level of the received signal. The biased voltage that was applied immediately preceding this drop is then selected as the proper tune voltage.

The magnitude of the received signal in this second system is determined by comparing it against four analog levels. If, in a given situation, all of the levels are exceeded, the apparatus must reduce the gain of the receiver until the received signal falls between the minimum and maximum comparison levels. Similarly, if the received signal is below all four levels, the apparatus must increase the gain of the receiver. This arrangement slows the tuning operation and renders the tuning system in operative in areas of very high or very low signal strength, where the receiver cannot bring the received signal within the range of the comparison levels.

The received signal strength is presumed under this system to have one local maximum as the varactor biased voltage increases. Consequently, as soon as a drop in received signal is noted, the system concludes that the optimum tuning condition has been determined, when in some cases the drop in signal strength could be only a local maximum and far below the true maximum signal at optimum antenna tuning. More likely, the received signal will have several local maxima, many of them spurious due to unpredictable effects such as noise and movement of the antenna during the tuning operation.

This system also requires that a tuning command signal be transmitted with the paging signals. The disclosure specifies that an unmodulated carrier should be transmitted for approximately 200 milliseconds following the command signal to permit the tuning apparatus to tune. This requires a redesigning of the paging protocol and uses time that could otherwise be used for message transmission. As may be appreciated, in the context of a time multiplexed paging protocol, such tuning time represents a degradation in overall information band width. The more often the tuning command signal is transmitted, the more time is diverted from message transmission.

If a receiver according to this second WIPO disclosure is moved between tuning intervals, it may be operated in an untuned state until another tune command is received. A receiver operated in an untuned state may miss a message.

U.S. Pat. No. 5,136,719 issued Aug. 4, 1992 to Gaskill et al shows an automatic antenna tuning method and apparatus. In accordance with the Gaskill method of automatic antenna tuning, prior to receiving each time multiplexed paging data packet the paging device automatically executes an antenna tuning procedure. The antenna includes a tuning terminal whereat variation in voltage causes variation in antenna impedance-tuning. By use of a D-A converter, the paging receiver controller steps through the entire antenna tuning voltage range at given magnitude voltage increments or steps. The controller monitors a received signal strength indicator, e.g., AGC signal, to detect the occurrence of a peak received signal strength condition and associate that condition with a given step in the tuning voltage range traversal. Given the antenna tuning voltage associated with maximum signal strength, the antenna is tuned using that voltage in time to receive and decode the data packet under optimum antenna tuning conditions.

One important parameter in the scanning of the entire antenna tuning voltage range under the Gaskill method is the number of steps taken, and therefore the magnitude of voltage increments between steps. The smaller the increments in voltage between each step, the more accurately the optimum tuning condition can be identified. If the voltage increment between steps is too large, the peak in the received signal strength indicator may be missed and optimum tuning conditions not achieved. Using a large number of steps, and, therefore, a small voltage increment between steps, requires greater processing time for the tuning cycle. Accordingly, there is a tradeoff between the time required to execute a tuning cycle and the accuracy achieved in that tuning cycle. The more time permitted for an antenna tuning cycle, the more accurate the antenna tuning. The faster the tuning cycle, the less accurate the antenna tuning. As may be appreciated, in a time multiplexed data packet delivery system it is desirable to minimize the time required to execute any procedure associated with receiving a packet. Thus, overall system requirements may impose certain time limitations on the antenna tuning procedure, and therefore impose limitations on the accuracy of the antenna tuning procedure as set forth under the Gaskill method.

The method of antenna tuning proposed under the above-noted Gaskill method suffers from an inability to compensate for or adapt to certain conditions. For example, the Gaskill method must select a fixed antenna tuning control voltage range based upon knowledge of specific watch conditions and component characteristics, e.g., knowledge of a specific varactor curve. If the actual conditions under the which the watch operates, or if substitute components are used having different characteristics, the selected antenna tuning control voltage range may be inappropriate, i.e., too big or too small, to detect and utilize optimum antenna tuning control voltage levels. Thus, the Gaskill method of antenna tuning lacks any adaptive capability with respect to change in device environment or component selection.

Thus, while the Gaskill method of automatic tuning provides great improvement in the context of time multiplexed paging protocols and associated radio receivers, it is desirable that the tuning cycle used in such a time multiplexed protocol be minimized with respect to time required for execution, yet retain high reliability and precision in accurately identifying the optimum antenna tuning conditions. The subject matter of the present invention provides such an improvement to the Gaskill method of automatic antenna tuning.

SUMMARY OF THE INVENTION

A preferred embodiment of the present invention in a first aspect is a method and associated apparatus for automatic antenna tuning on an adaptive basis. In initiating a tuning cycle under the method of the present invention, the receiver maintains an antenna tuning voltage predictor. The predictor allows the receiver to identify the most likely antenna tuning voltage needed for optimum tuning conditions. Having this antenna tuning voltage predictor, the receiver need not tune through an entire antenna tuning voltage range, but can select and traverse a relatively smaller antenna tuning voltage sub-range. Antenna tuning is accomplished by traversing this relatively small tuning voltage sub-range and identifying a peak magnitude in the received signal strength indicator associated with a tuning voltage within this sub-range. In this manner optimum antenna tuning conditions are identified. The voltage increments between steps in the traversal of this sub-range may be relatively few and small, and therefore both fast and accurate in detecting a maximum received signal strength peak.

According to one aspect of the present invention, the predictor used to anticipate preferred antenna tuning conditions may be initially calculated as a function of the radio frequency upon which the device operates. During operation on that frequency, the method of the present invention proposes identifying a relationship between the detected optimum antenna tuning condition and the predicted optimum antenna tuning conditions in calculating a new antenna tuning voltage sub-range. In this manner, the method of the present invention attempts to center the resulting detected optimum antenna tuning condition within the proposed antenna tuning voltage sub-range. More particularly, the method of the present invention attempts to center the detected optimum antenna tuning condition within the proposed antenna tuning control voltage sub-range so as to improve the probability that optimum antenna tuning conditions will occur in the proposed antenna tuning control voltage sub-range for the next antenna tuning cycle.

Furthermore, the method of the present invention proposes maintaining a difference value between the calculation of antenna tuning control voltage as a function of frequency and antenna tuning control voltage calculated as discussed above to center detected antenna tuning conditions under each proposed antenna tuning control voltage sub-range. This difference value is then used when the device switches to a new frequency to provide an adjustment in the calculation of optimum antenna tuning control voltage otherwise based solely on the new frequency. This accounts for watch specific environmental and component conditions which may affect the prediction of optimum antenna tuning conditions based solely on frequency.

According to another aspect of the present invention, an antenna tuning cycle scans a given sub-range of antenna tuning control voltages and determines a detected preferred antenna tuning control voltage. The method of the present invention contemplates that this detected preferred antenna tuning control voltage be returned to a separate portion of the device responsible for calculating a next predicted antenna tuning control voltage required. By providing this return value corresponding to an actual detected optimum antenna tuning control signal, a variety of adaptive antenna tuning algorithms are made possible.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The preferred embodiment of the present invention as illustrated in the accompanying drawings and described herein is a method and apparatus for adaptively and automatically tuning an antenna in a time division multiplexed radio signal paging system. The method of the present invention takes into account the current radio frequency on which information is to be obtained and, further, takes into account previous tuning cycle results to predict an optimum tuning condition for the antenna prior to each reception cycle. By predicting the antenna tuning voltage required to achieve optimum tuning conditions, the receiver need not tune through an entire antenna tuning voltage range, can use smaller increments in voltage between each step in the antenna tuning voltage sub-range traversal, and can provide an accurate and relatively fast antenna tuning cycle.

The antenna tuning method and apparatus of the present invention is similar in certain aspects to the antenna tuning method and apparatus shown by Gaskill in U.S. Pat. No. 5,136,719 issued Aug. 4, 1992 to Gaskill et al. In this respect, the antenna tuning method and apparatus of the present invention operates just prior to receiving and decoding a time multiplexed data packet on a given radio frequency. The receiver may operate at one frequency for an indefinite number of data packet receiving cycles, or may switch to other radio frequencies of the paging system to receive a data packet. Antenna tuning is accomplished by variation in voltage applied to the antenna tuning/matching network. The method and apparatus of the present invention differs, however, in the range of antenna tuning voltage traversed in seeking a peak received signal strength condition, use of the current radio frequency and of information obtained in prior antenna tuning cycles to predict an optimum antenna tuning condition for the current antenna tuning cycle, and an ability to use a finite number of relatively small voltage increments in traversing an antenna tuning voltage range within a given time period. The disclosure of U.S. Pat. No. 5,136,719 is incorporated herein fully by reference and relied upon to the extent that the Gaskill et al method and apparatus of automatic antenna tuning as disclosed in U.S. Pat. No. 5,136,719 is compatible with the method and apparatus of the present invention.

Figure 1:
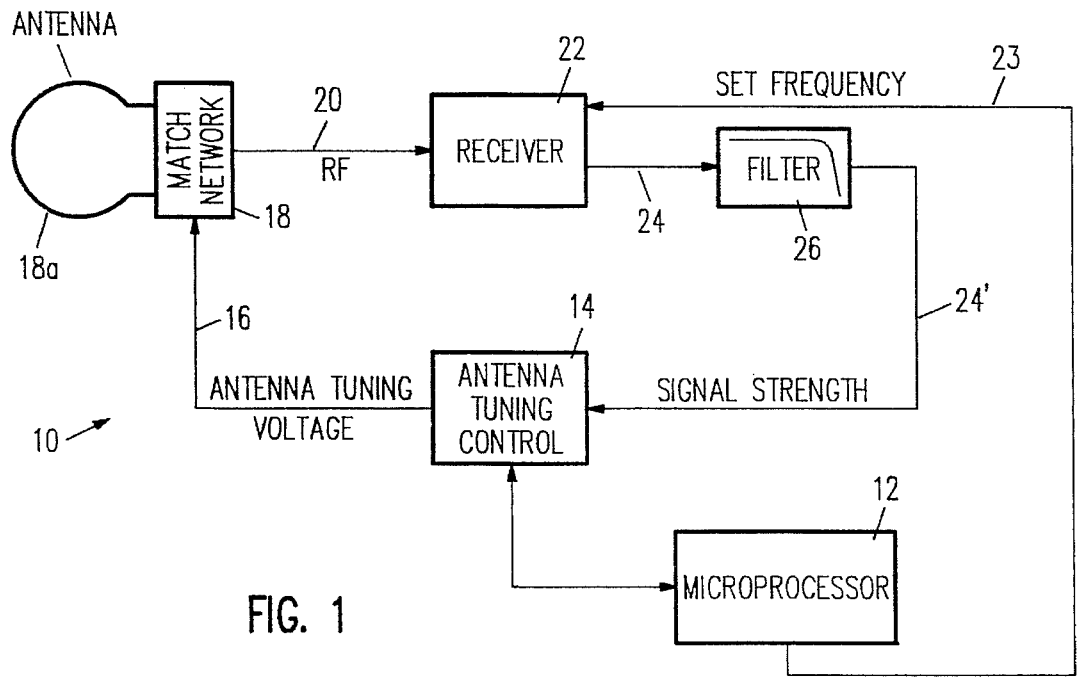
FIG. 1 illustrates in block diagram a paging device including adaptive automatic antenna tuning in accordance with the present invention.

FIG. 1 illustrates in block diagram the antenna tuning subsystem proposed under the present invention for use in a wristband antenna wristwatch paging receiver device 10. Device 10 includes a microprocessor 12 responsible for overall control functions associated with operation of the device 10. Microprocessor 12 interacts with an antenna tuning control block 14 responsible for, among other device functions, application of a selected antenna tuning control voltage 16 to an antenna tuning/matching network 18. A radio frequency signal 20 provided by the network 18 is applied to a receiver block 22 of device 10. Microprocessor 12 delivers a set frequency command 23 to receiver 22 to establish a radio frequency reception channel for paging data. As may be appreciated, microprocessor 12 will operate receiver 22 on various frequencies depending on the success device 10 has in receiving paging data on a given frequency.

Block 22 produces a received signal strength indicator 24 applied, by way of filter 26, as indicator 24' to the block 14. In this manner, the block 14 may vary the antenna tuning control voltage 16 applied to antenna tuning/matching network 18 and concurrently monitor the received signal strength indicator 24'. By detecting a peak magnitude in the received signal strength indicator 24', block 14 identifies an antenna tuning control voltage 16 needed to establish optimum antenna tuning conditions.

Figure 2:
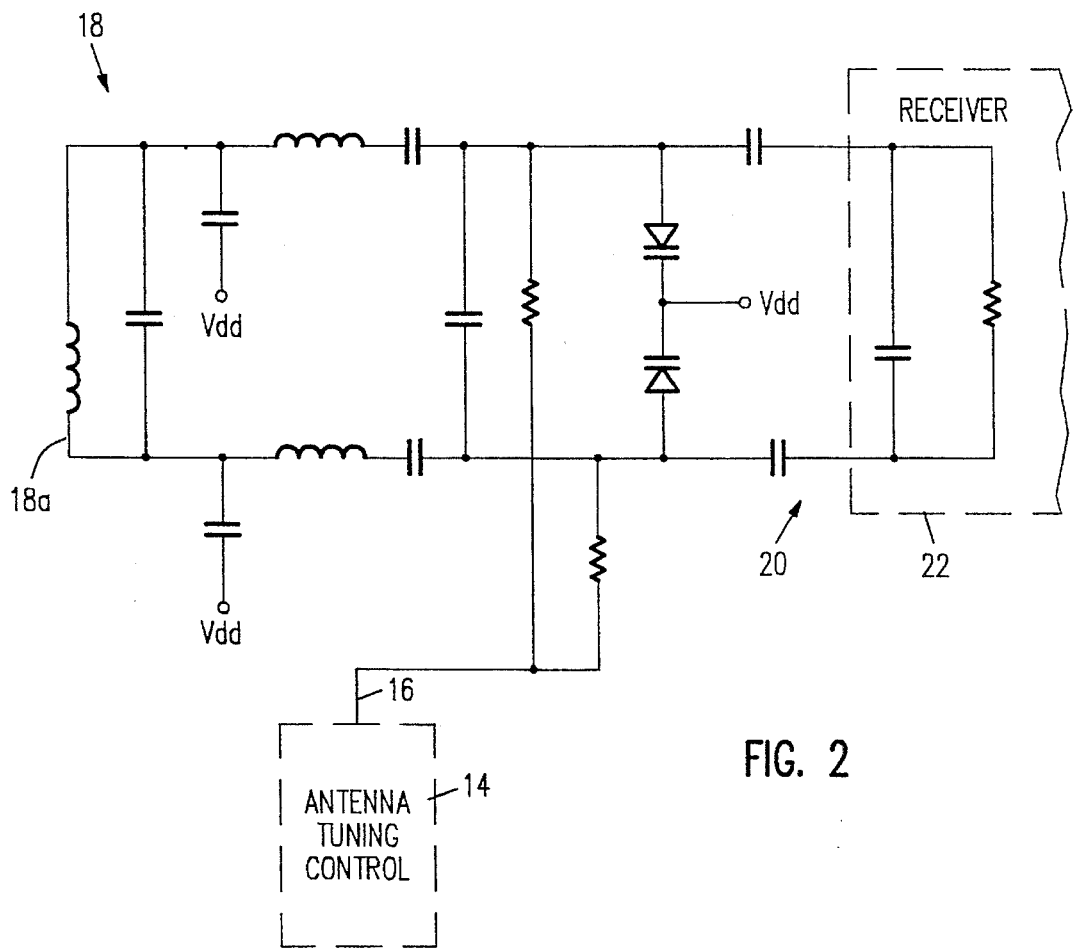
FIG. 2 details an antenna tuning/matching network illustrated in FIG. 1 and its relationship to a radio receiver block and an antenna tuning control block FIG. 1.

FIG. 2 details the antenna tuning/matching network 18 of FIG. 1 including its capacitive coupling to block 22 in delivering radio frequency signal 20 and its coupling to block 14 to receive the antenna tuning control voltage 16. The operation of the antenna tuning/matching network 18 as shown in FIG. 2 should be apparent to those skilled in the art. For the present discussion, it will be understood that the network 18 must match impedance with the block 22 and also respond to the antenna tuning control voltage 16 in establishing optimum tuning conditions as directed by block 14. Generally, the antenna tuning/matching circuit 14 resonates the antenna 18a and matches the tuned circuit to the input impedance of the receiver block 22 so as to provide optimum power transfer to the receiver block 22.

Figure 3:
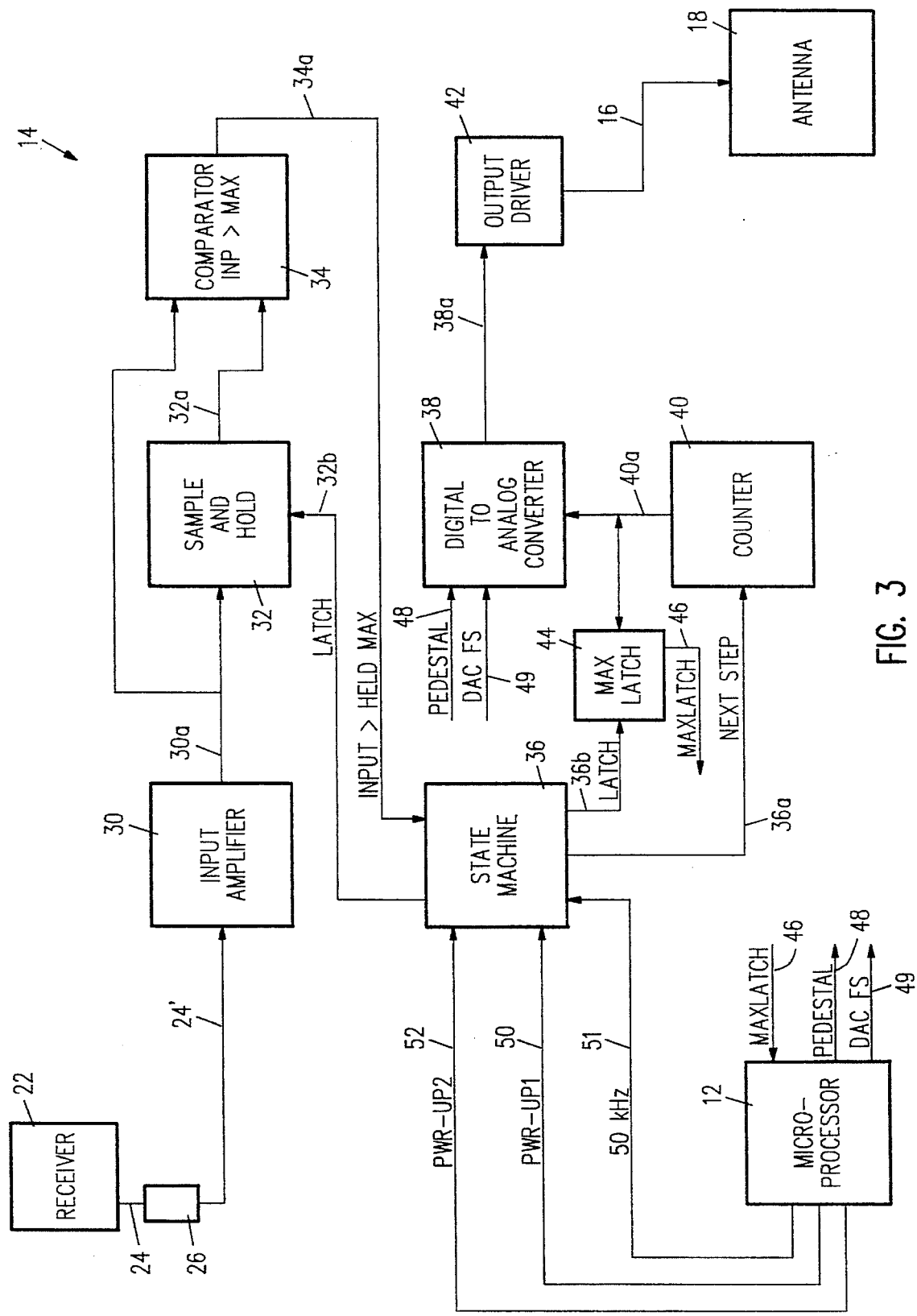
FIG. 3 details an antenna tuning control block of FIG. 1.

FIG. 3 details the antenna tuning control block 14 and its relationship to the receiver 22, microprocessor 12, and antenna tuning/matching network 18. In FIG. 3, receiver 22 delivers, by way of filter 26, the received signal strength indicator 24' to an input amplifier 30. Input amplifier 30 provides its output 30a to a sample and hold block 32 and a comparator 34. The output 32a of sample and hold block 32 is applied as the second input to comparator 34. Sample and hold block 32 includes a latch input 32b causing sample and hold block 32 to capture the output 30a presented by input amplifier 30 and present this captured value as its output 32a. Thus, comparator 34 compares the current received signal strength indicator 24' with the most recently captured value held in sample and hold block 32. The output 34a of comparator 34 indicates when the current received signal strength indicator 24' is greater than the output 32a of block 32, i.e., greater than the last captured value for received signal strength indicator 24'.

A state machine 36 receives the output 34a of comparator 34 and provides the latch input 32b to sample and hold block 32. State machine 36 monitors the output 34a of comparator 34 and asserts the latch input 32b for block 32 when the current received signal strength indicator is greater than the value held in block 32, i.e., when output 34a of comparator 34 is true. In this manner, state machine 36 can detect a peak magnitude in the received signal strength indicator 24'. State machine 36 controls operation of a digital to analog converter 38 responsible for producing the antenna tuning control voltage 16. More particularly, state machine 36 provides a next step clock output 36a to a counter block 40. Counter block 40 in turn provides its digital output 40a to the digital to analog converter 38. In response to a given output 40a of counter 40, therefore, digital to analog converter 38 produces a corresponding magnitude analog output 38a. Output 38a is applied by way of an output driver 42 to the antenna block 18 as the antenna tuning control voltage 16.

State machine 36 also provides a latch output 36b to a max latch block 44. Max latch block 44 can both read the output 40a of counter 40 and also write an input value into the digital to analog converter 38 to establish the magnitude of output 38a. Each time state machine 36 detects a true condition in the output 34a of comparator 34, i.e., when the current received signal strength indicator 24' is greater than the previously held maximum value therefor, state machine 36 asserts its output 36b to cause max latch block 44 to capture the current value in output 40a of block 40. By also then capturing the value of output 40a, max latch block 44 can then later apply this value to digital to analog converter 38 to re-establish the same antenna tuning control voltage 16 associated with a maximum value for the received signal strength indicator 24'.

As will be discussed more fully hereafter, microprocessor 12 makes use of the value held in max latch block 44 as a representation of detected optimum antenna tuning conditions. Thus, microprocessor 12 receives a max latch input 46 from max latch block 44. Microprocessor 12 delivers to antenna tuning control block 14 a pedestal input 48 and a DAC FS (digital to analog converter full scale) input 49. The pedestal input 48 and DAC FS input 49 are applied to digital to analog converter 38 to limit the range of antenna tuning control voltage 16 applied to antenna tuning/matching network 18 when seeking a peak value in the received signal strength indicator 24'.

The pedestal input 48 and DAC FS input 49 establish an antenna tuning control voltage range centered generally around a predicted optimum antenna tuning control voltage 16. Generally, the pedestal input 48 represents an offset within the full antenna tuning control voltage range and the DAC FS input 49 represents a gain parameter to the digital to analog converter 38. Thus, the DAC FS input 49 establishes the size of the sub-range of antenna tuning control voltages traversed in seeking a peak magnitude in the received signal strength indicator 24' and the pedestal input 48 establishes the location of that sub-range within the full antenna tuning control voltage range. In this manner, the antenna tuning control block 14 need not traverse the entire antenna tuning control voltage 16 range in seeking a peak magnitude in the received signal strength indicator 24'. The antenna tuning method of the present invention adapts as a function of the current radio frequency and prior antenna tuning cycles in establishing the values for pedestal input 48 and DAC FS input 49.

State machine 36 further receives from microprocessor 12 power-up signals 50 and 52 indicating to state machine 36 the beginning of a data packet reception cycle, and the need for state machine 36 to execute an automatic antenna tuning cycle prior to receiving the data packet. Microprocessor 12 further provides a clock 51 for driving state machine 36.

Figure 4:
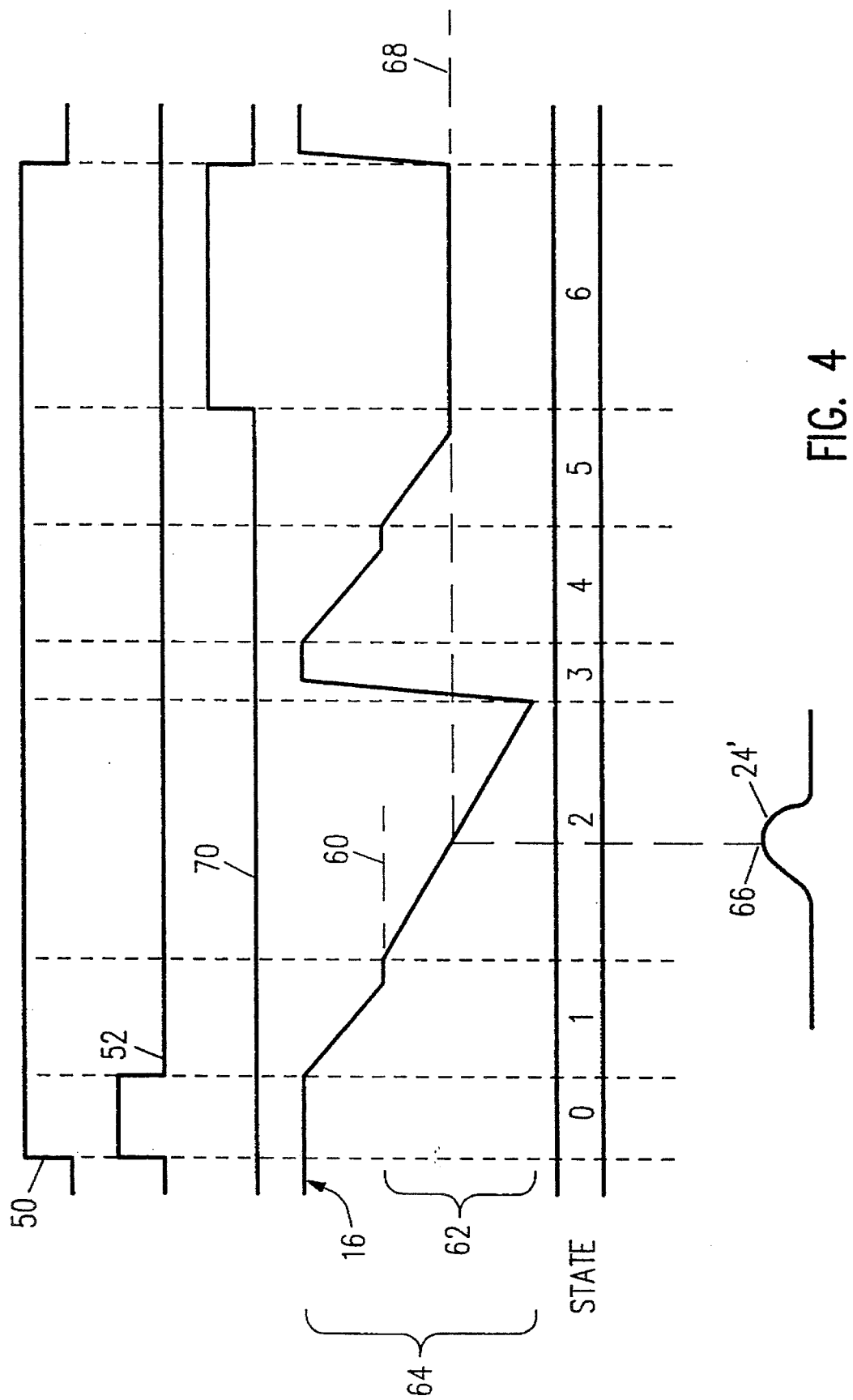
FIG. 4 illustrates sequential states in an antenna tuning cycle under the present invention including illustration of an antenna tuning control voltage magnitude throughout those states.

FIG. 4 illustrates state machine 36 (FIG. 3) antenna tuning state definitions 0–6 associated with antenna tuning under the present invention. More particularly, FIG. 4 illustrates the magnitude of antenna tuning control voltage 16 through the antenna tuning cycle of states 0–5 and the data packet reception and decoding cycle of state 6. During state 6, antenna tuning control voltage 16 remains at an optimum magnitude. The antenna tuning cycle begins in state 0 as a part of a device 10 activation and data packet reception period indicated by a rising edge in power-up signal 50. Power-up signal 52 rises concurrently with power-up signal 50, but drops at the end of state 0. State 0 thereby provides an initial power-up period for device 10.

The falling edge of power-up signal 52 indicates the beginning of state 1 wherein the antenna tuning control voltage 16 ramps to a pedestal voltage 60. The pedestal voltage 60 is calculated using prior antenna tuning cycles to provide a sub-range 62 of the antenna tuning voltage range 64 through which a search for optimum tuning conditions is performed. It will be understood that no voltage scale is represented in magnitude of signal 16 or time scale in the relative size of states 0–6 in FIG. 4, the important point being that sub-range 62 is significantly smaller than range 64. During state 2, the antenna tuning control voltage 16 steps by operation of counter 40 incrementally through the sub-range 62 while the received signal strength indicator 24' is monitored by block 14 to detect a peak value 66. State 2 terminates after antenna tuning control voltage 16 has traversed the sub-range 62. At this point, the antenna tuning control voltage 16 step associated with the peak value 66 is maintained in max latch block 44 as a representation of the antenna tuning voltage required for optimum tuning conditions for the upcoming data packet reception cycle (state 6 in FIG. 4). During state 3, the antenna tuning control voltage is brought quickly back to its maximum potential relative to the full range 64.

During state 4, the antenna tuning control voltage 16 is again ramped to the pedestal potential 60 as in state 1. In state 5, the antenna tuning control voltage is slewed to its final value 68 as determined by the peak magnitude 66 in the received signal strength indicator 24. During state 6, the antenna 18a is optimally tuned by application of the antenna tuning control voltage 16 at the potential 68 for reception of the incoming data packet. The beginning of state 6, and initiation of packet reception and decoding, is indicated by a rising edge in the power-up signal 70. The end of state 6 is indicated by the falling edges in power-up signals 50 and 70. Following state 6, the receiver goes into a sleep mode, i.e., deactivates the radio receiving components, and waits for a next packet receiving cycle as indicated by the power-up signals 50, 52 and 70.

Figure 5:
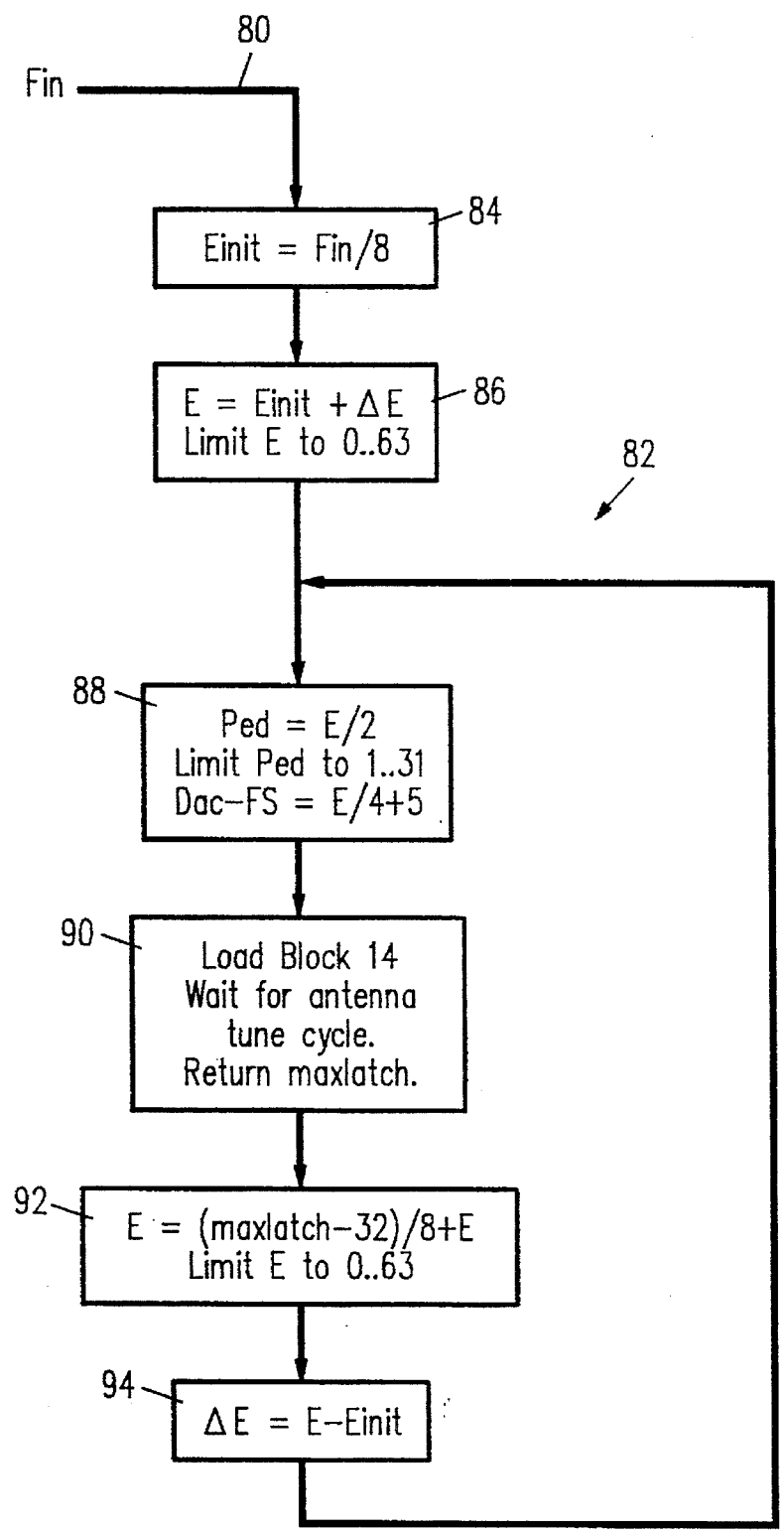
FIG. 5 is a flow chart illustrating adaptive antenna tuning in accordance with the represent invention taking into account prior antenna tuning cycles to predict an optimum antenna tuning condition for a next antenna tuning cycle.

During the waiting or sleep period for device 10, the most recent antenna tuning cycle is considered by microprocessor 12 for adaptively calculating a pedestal input 48 and DAC FS input 49 for use in the next upcoming antenna tuning cycle. FIG. 5 is a flow chart illustrating calculation by microprocessor 12 as a function of the history of prior antenna tuning cycles. In FIG. 5, the flow chart shows an entry path 80 associated with the switching to a new radio frequency for receiving the next data packet, i.e., use of set frequency input 23 to receiver 22. If the receiver 22 remains tuned to one frequency between data packet receiving cycles, then processing relative to the calculation of a pedestal input 48 and DAC FS input 49 remains in the loop 82 of FIG. 5.

Beginning with the entry path 80, processing begins in block 84 wherein the new radio frequency variable Fin is used to calculate a Einit value. The numeric value of variable Fin is a function of the actual radio frequency expressed in MHz, i.e., Fin equals the integer result of (MHz·10–852). For example, at 88 MHz the value of Fin is 28, whereas at 108 MHz the value of Fin is 228. Thus, the variable Einit represents a preferred antenna tuning condition based solely on the frequency on which the radio operates.

The variable Einit is then added to a variable delta E to derive a variable E in block 86. The value of delta E is initially set to zero at reset of the device, but otherwise represents a difference between predicted optimum antenna tuning conditions and previously detected optimum antenna tuning conditions. In this regard, delta E represents conditions specific to a particular device 10, e.g., antenna band size adjustment, device environment, and device 10 component variation, and affecting antenna tuning. The variable E represents predicted preferred antenna tuning conditions taking into account both radio frequency, as represented by the value of Einit, and watch specific conditions affecting antenna tuning, as represented by the value of delta E. The result of summing the variables Einit and delta E is limited to a specific range corresponding to the particular hardware implementation, in this case, limited to a range of values 0 to 63.

Continuing to block 88, the pedestal input 48 is calculated by dividing in half the value of variable E. This calculated value for pedestal input 48 is then limited to the range of 1 to 31. A DAC FS input 49 value is then computed by dividing the value of variable E by 4 and then adding the value 5. In block 90, the pedestal value and digital to analog converter full scale value are loaded into block 14, specifically digital to analog converter 38, for producing an antenna tuning control voltage 16 sub-range 62, i.e., beginning at the pedestal value 60 and extending a given magnitude therefrom. The calculations presented in block 88 are based on experimentation and certain hardware limitations imposed in the implementation of the present invention. The calculations were obtained by first constructing a model of the watch and its antenna tuning characteristics and developing the necessary computations to establish suitable values for the pedestal input 48 and DAC FS input 49. As discussed above, the values obtained for pedestal input 48 and DAC FS input 49 should establish an antenna tuning control voltage sub-range centered generally around the predicted preferred antenna tuning condition as represented by the variable E.

During block 90, the receiver 22 is idle and waits for the next antenna tuning cycle. Upon completion of the next antenna tuning cycle, i.e., states 0–5 to tune antenna block 18 and state 6 to receive a data packet, a max latch value 46 is returned. Max latch value 46 is an integer value representing the step, i.e., counter 40 output 40a value, associated with the peak magnitude 66 in received signal strength indicator 24' during traversal of sub-range 62. In block 92, max latch value 46 is used to calculate a new value for the variable E. The variable E is then limited to the range of 0 to 63. Generally, the computation represented in block 92 establishes an offset between the detected preferred antenna tuning conditions and the center of the antenna tuning control voltage sub-range traversed. A new value for the variable E is then calculated, using this offset from center value, to better position the next detected preferred antenna tuning condition at the center of the antenna tuning control voltage range traversed. As may be appreciated, by maintaining the detected preferred antenna tuning condition substantially at the center of the antenna tuning control voltage sub-range traversed, the algorithm has a greater probability of identifying a true peak value in the received signal strength indicator 24'.

In block 94, the variable delta E is computed as the difference between the variable E and the variable Einit. The variable delta E, as discussed above, represents watch specific factors, including watch condition, environment, and component variations, affecting antenna tuning. The variable delta E is calculated following each calculation of a new variable E and stands ready for use, should the device 10 switch frequencies, in block 86 to provide a predictor value E based on both radio frequency factors and on watch specific conditions affecting antenna tuning.

Thus, an improved automatic antenna tuning method and apparatus has been shown and described. The method and apparatus of the present invention advantageously adapts to conditions affecting antenna tuning and maintains a predictor value defining an antenna tuning control voltage sub-range. By limiting the size of the antenna tuning control voltage sub-range traversed in detecting a preferred antenna tuning condition, antenna tuning is accomplished more quickly and more accurately relative to prior antenna tuning methods which traverse an entire antenna tuning control voltage range. Because the method and apparatus of the present invention is adaptive, it compensates for unpredicted or uncontrollable events such as watch environment conditions, adjustment in antenna wristband length, and even substitute components, e.g., varactors, having different antenna tuning characteristics.

It will be appreciated that the present invention is not restricted to the particular embodiment that has been described and illustrated, and that variations may be made therein without departing from the scope of the invention as found in the appended claims and equivalence thereof. For example, the adjustment in predicted preferred antenna tuning conditions provided by the variable delta E is implemented as a simple offset calculation. It should be understood, however, that a more complex calculation in accounting for watch specific conditions may be used to more accurately, if necessary, develop a predicted preferred antenna tuning condition. The use of an offset as shown in the preferred embodiment of the present invention is a result of hardware limitations imposed, and the adequacy in the present implementation of a simple offset function in establishing appropriate antenna tuning conditions. Should greater precision be required, or sufficient processing resources be available, it will be understood that a more complex predictor value could be calculated and maintained in predicting preferred antenna tuning conditions.

What is claimed is:

1. A programmable antenna tuning device for coupling an antenna and a radio receiver, said device generating an antenna tuning signal, said radio receiver being able to tune over a range of frequencies, and being responsive to a signal representing a desired reception frequency, said device comprising:

an antenna tuning element coupled to said antenna and responsive to said antenna tuning signal, said antenna tuning element being operable within a first range of said antenna tuning signal;

a prediction element responsive to at least one of said signal representing a desired reception frequency and a prior stored preferred antenna tuning signal for producing a predicted tuning signal representing a predicted value for said antenna tuning signal, and for producing a sub-range signal which defines a sub-range for said antenna tuning signal, said sub-range being less than said first range and including the value of said predicted tuning signal; and a control element means for receiving from said prediction element said sub-range signal and for applying said antenna tuning signal through the range of said sub-range, identifying a preferred antenna tuning signal by detecting the optimum output from said antenna, storing said preferred antenna tuning signal, and applying said preferred antenna tuning signal to said antenna tuning element.

2. A device according to claim 1 wherein said sub-range signal defines an offset value and a gain parameter and said control element means includes an analog voltage device producing variation in voltage within said sub-range in response to said offset value and said gain parameter for application to a voltage responsive tuning network of said antenna tuning element.

3. A device according to claim 1 wherein said control element means returns to said prediction element a representation of said preferred antenna tuning signal.

4. A device according to claim 1 wherein said prediction element is responsive to said signal representing a desired reception frequency and said prediction element produces said predicted tuning signal as a function of a radio frequency at which said radio receiver is to receive information when attached to said antenna tuning element.

5. A device according to claim 1 wherein said control element means provides to said prediction element a representation of a value of said preferred antenna tuning signal as stored, and said prediction element produces a next predicted antenna tuning signal taking into account said preferred antenna tuning signal.

6. A method of tuning an antenna for optimum reception of a desired frequency signal by application of an antenna tuning signal to an antenna tuning network, said network having the the full tuning range, the method comprising the steps:

predicting a preferred antenna tuning signal based upon at least one of said desired frequency and a prior stored preferred antenna tuning signal;

identifying an antenna tuning sub-range less than said full range, said sub-range including said predicted preferred antenna tuning signal;

applying to said antenna tuning network antenna tuning signals having values within said sub-range while monitoring a received signal strength indicator;

detecting a preferred antenna tuning signal associated with a maximum value in said received signal strength indicator;

storing said preferred antenna tuning signal; and applying said detected preferred antenna tuning signal to said network.

7. A method of tuning an antenna for reception of a desired frequency in a radio receiver and antenna combination, said radio receiver being tunable to several radio signal frequencies and having an antenna tuning element responsive to an antenna tuning control signal, said tuning control signal having a first range, the antenna tuning element providing a preferred antenna tuning at a given tuning control signal value, the method of antenna tuning comprising the steps:

calculating a predicted preferred antenna tuning control signal value as a function of at least one of said desired frequency and a prior stored preferred antenna tuning control signal;

selecting an antenna tuning sub-range within said antenna tuning control signal range as a function of said predicted preferred antenna tuning control signal value, said sub-range being less than said first range;

operating said radio receiver on said desired frequency while monitoring a received signal strength indicator;

presenting to said antenna tuning element antenna tuning control signal values taken from said sub-range;

selecting and storing a preferred antenna tuning control signal value in association with a maximum received signal strength indicator; and applying said selected preferred antenna tuning control signal value to said antenna tuning element.

8. A method of generating an antenna tuning signal for a multifrequency radio receiver, said radio receiver being tuned to a desired frequency, said tuning signal having a tuning range, including the steps of:

a) calculating a predicted value of said tuning signal based entirely upon the value of said desired frequency, and determining an error in said predicted value, b) modifying said predicted value of said tuning signal based upon an error found in a previous predicted value to generate a modified predicted value, c) tuning said antenna over a subset range of said tuning range, said subset range being determined by and including said modified predicted value, said subset range being less than said tuning range, d) modifying said modified predicted value based upon the value of tuning signal which produces the optimum reception by said radio receiver, e) calculating the error between the predicted value and the value of the tuning signal that produces the optimum reception by said radio receiver for use for use in performing the calculation of a predicted value when the value of said desired frequency changes.

* * * * *